United States Patent [19]
Takamura et al.

[11] Patent Number: 5,062,545
[45] Date of Patent: Nov. 5, 1991

[54] AUTOMATIC VENDING MACHINE DISPENSING MECHANISM

[75] Inventors: Toshiyuki Takamura; Kazunari Kurihashi; Masazumi Harada, all of Gunma, Japan

[73] Assignee: Sanden Corporation, Japan

[21] Appl. No.: 598,790

[22] Filed: Oct. 15, 1990

Related U.S. Application Data

[63] Continuation of Ser. No. 188,479, Apr. 29, 1988, abandoned.

[30] Foreign Application Priority Data

Apr. 30, 1987 [JP] Japan ............................ 62-65774[U]

[51] Int. Cl.[5] ............................................ B65G 59/00

[52] U.S. Cl. .................................. 221/152; 221/153; 221/194; 221/106; 221/111

[58] Field of Search ............... 221/104, 106, 107, 111, 221/151-153, 194, 279, 280, 295, 11, 12, 226, 251, 253, 289, 290, 312 R, 125, 154, 247, 248, 250

[56] References Cited

U.S. PATENT DOCUMENTS

| | | | |
|---|---|---|---|
| 1,139,711 | 5/1915 | Ogden . | |
| 1,270,194 | 6/1918 | Nybak . | |
| 1,301301 | 4/1919 | Nishoka . | |
| 1,814,955 | 7/1931 | Oddsen . | |
| 2,435,526 | 2/1948 | Young et al. | 312/48 |
| 2,563,204 | 8/1951 | Andrews | 312/48 |
| 2,784,872 | 3/1957 | Lux | 221/248 X |
| 2,816,719 | 12/1957 | Richert . | |
| 2,901,964 | 9/1959 | Johnson . | |
| 2,923,434 | 2/1960 | Gabrielsen | 221/21 |
| 2,951,616 | 9/1960 | Johnson | 221/67 |
| 3,001,669 | 9/1961 | Tandler et al. | 221/12 |
| 3,057,513 | 10/1962 | Turman | 221/114 |
| 3,132,732 | 5/1964 | Robillard | 221/250 X |
| 3,185,280 | 5/1065 | Nathan et al. | 221/104 X |
| 3,193,135 | 7/1965 | Bentzman | 221/6 |
| 3,194,432 | 7/1965 | Breitenstein et al. | 221/82 |
| 3,276,624 | 10/1966 | Payne | 221/125 |
| 3,348,733 | 10/1967 | Johnson | 221/298 |
| 3,360,163 | 12/1967 | Fessler | 221/152 |
| 3,540,562 | 11/1970 | Ptacek | 194/10 |
| 3,613,945 | 10/1971 | Rockola | 221/295 |
| 3,795,345 | 3/1974 | Baxendale | 221/125 |
| 3,799,393 | 3/1974 | Baxendale | 221/67 |
| 3,837,528 | 9/1974 | Rakucewicz | 221/114 |
| 3,908,859 | 9/1975 | Hohmann | 221/279 X |
| 3,924,779 | 12/1975 | Lindsey | 221/67 |
| 3,991,907 | 11/1976 | Kull | 221/295 X |
| 4,000,800 | 1/1977 | Loucks, Sr. | 221/153 X |
| 4,057,171 | 11/1977 | Hatori et al. | 221/6 |
| 4,423,828 | 1/1984 | Tanaka et al. | 221/129 |
| 4,456,147 | 6/1984 | Tominaga | 221/67 |
| 4,542,834 | 9/1985 | Kurosawa et al. | 221/116 |
| 4,561,564 | 12/1985 | Negishi | 221/64 |
| 4,565,300 | 1/1986 | Kokubun et al. | 221/116 |
| 4,574,980 | 3/1986 | Kurosawa et al. | 221/116 |
| 4,673,105 | 6/1987 | Kurosawa et al. | 221/281 |
| 4,676,398 | 6/1987 | Kokubun et al. | 221/129 |
| 4,776,487 | 10/1988 | Kurosawa et al. | 221/2 |
| 4,854,477 | 8/1989 | Kurosawa et al. | 221/1 |

FOREIGN PATENT DOCUMENTS

| | | | |
|---|---|---|---|
| 2006315 | 8/1971 | Fed. Rep. of Germany . | |
| 3344304 | 6/1984 | Fed. Rep. of Germany . | |
| 239698 | 3/1969 | U.S.S.R. | 221/11 |

*Primary Examiner*—David H. Bollinger
*Attorney, Agent, or Firm*—Banner, Birch, McKie & Beckett

[57] ABSTRACT

A dispensing mechanism for an automatic vending machine includes a conveying mechanism to move merchandise toward a discharge passage, and a discharge control mechanism. The discharge control mechanism holds the merchandise and prevents the merchandise from falling into the discharge passage when the dispensing mechanism is off. The discharge control mechanism includes a control plate which is biased to contact and hold the merchandise, and a locking element which prevents the rotation of the control plate when the dispensing mechanism is off. The engagement between control plate and locking element is controlled by a solenoid which permits the rotation of the control plate during the dispensing operation.

30 Claims, 6 Drawing Sheets

AUTOMATIC VENDING MACHINE DISPENSING MECHANISM

This application is a continuation of application Ser. No. 07/188,479, filed Apr. 29, 1988, now abandoned.

TECHNICAL FIELD

The present invention relates to an automatic vending machine. More particularly, the present invention relates to a device for preventing merchandise from falling off of the dispensing portion of a shelf.

BACKGROUND OF THE INVENTION

Many types of merchandise are sold in automatic vending machines which use different types of dispensing mechanisms. FIG. 1 is a partial sectional view of one type of vending machine 1 which is suitable for storing and dispensing, for example, paper packages of beverages.

Storage chamber S is defined in vending machine 1, and at least one column C is disposed in storage chamber S to store merchandise. Column C includes outer frame 2 with merchandise discharge opening 2a, a plurality of shelves 3 extending backwardly within frame 2, and dispensing mechanism 4 located on the lower portion of frame 2 opposite discharge opening 2a. Dispensing mechanism 4 dispenses merchandise individually through discharge opening 2a. Each shelf 3 is vertically movably connectable with each other. When the merchandise stored on one shelf is sold out, the adjacent shelf 3 vertically translates and replaces the empty shelf.

Dispensing mechanism 4 includes merchandise conveying or pushing device 41 having a pair of pushing elements 411 horizontally movable along shelf 3 by motor 42 through endless chain elements 43, 44. Fall preventing device 45 which operates as a discharge control mechanism prevents the merchandise from falling into discharge opening 2a. Fall preventing device 45 is disposed on discharge opening 2a of column C and, as shown in FIG. 2, includes attachment element 451 fixed on outer frame 2, control plate 452 rotatably supported on attachment element 451 through support shaft 453, and coil spring 454 which biases control plate 452 toward merchandise A. Therefore, merchandise stored on the lowermost shelf 3 is normally held between control plate 452 and pushing element 411, and is dispensed by the movement of pushing element 411.

As explained above, the merchandise positioned for dispensing is held between control plate 452 of fall preventing device 45 and pushing element 411. The merchandise is normally pushed away from the discharge passage and are held in position due to the recoil strength of coil spring 454 on control plate 452. However, if the force of control plate 452 acting against merchandise A is small, merchandise A may fall through discharge opening 2a into the discharge passage of vending machine 1 when vending machine 1 is shaken, hit, or tilted. If the force of control plate 452 is strong, this problem is eliminated. However, if the recoil strength of coil spring 454 is increased, the dispensing force of pushing element 411 must be increased correspondingly to dispense merchandise. If the force of pushing element 411 is too strong, more than one unit of merchandise may be dispensed in one dispensing cycle.

Furthermore, control plate 452 is always unlocked and is rotated easily by external forces. Thus, merchandise may be stolen by pivoting control plate 452 from outside vending machine 1 through merchandise discharge opening 2a.

SUMMARY OF THE INVENTION

It is a primary object of this invention to provide a dispensing mechanism for an automatic vending machine which smoothly dispenses without damaging merchandise.

It is another object of this invention to provide a dispensing mechanism for an automatic vending machine having improved merchandise theft prevention.

The invention is directed to an automatic vending machine including at least one column for storing and dispensing merchandise, a discharge opening and a dispensing mechanism. The column includes at least one shelf for supporting merchandise. The dispensing mechanism comprises a conveying mechanism for conveying the merchandise through the discharge opening and a discharge control mechanism for controlling the passage of the merchandise through the discharge opening. The discharge control mechanism comprises a control plate pivotally supported adjacent the discharge opening and a locking mechanism for releasably locking the control plate. The locking mechanism being movable from a first position wherein the locking means locks the control plate to a second position wherein the locking mechanism releases the control plate to permit rotation thereof. The discharge control mechanism further includes a control mechanism for controlling the position of the locking mechanism.

Various additional advantages and features of novelty which characterize the invention are further pointed out in the claims that follow. However, for a better understanding of the invention and its advantages, reference should be made to the accompanying drawings and descriptive matter which illustrate and describes a preferred embodiment of the invention.

DETAILED DESCRIPTION OF THE PREFERRED EMBODIMENT

Figure 1:
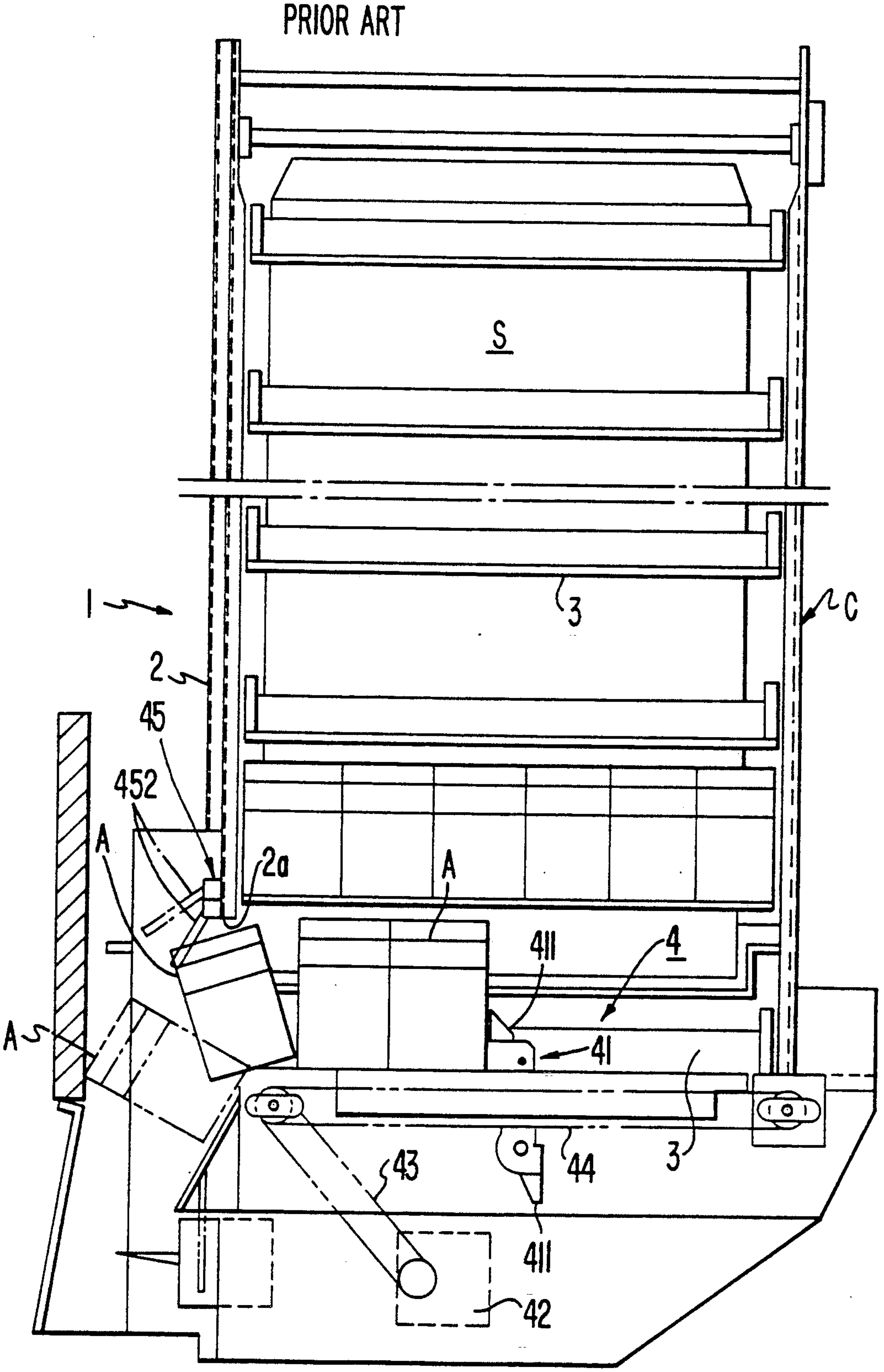
FIG. 1 PRIOR ART
FIG. 1 is partial sectional view of a vending machine illustrating a conventional dispensing mechanism.
Figure 2:
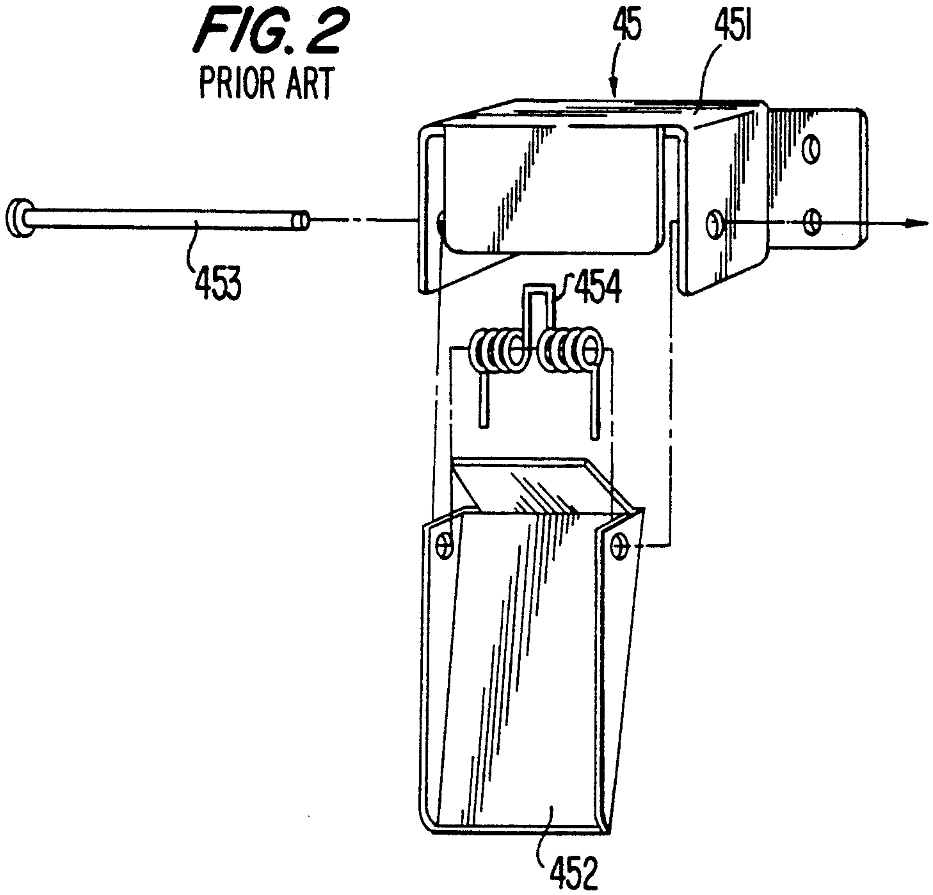
FIG. 2 PRIOR ART
FIG. 2 is an exploded perspective view of the merchandise fall preventing device used in the vending machine of FIG. 1.
Figure 3:
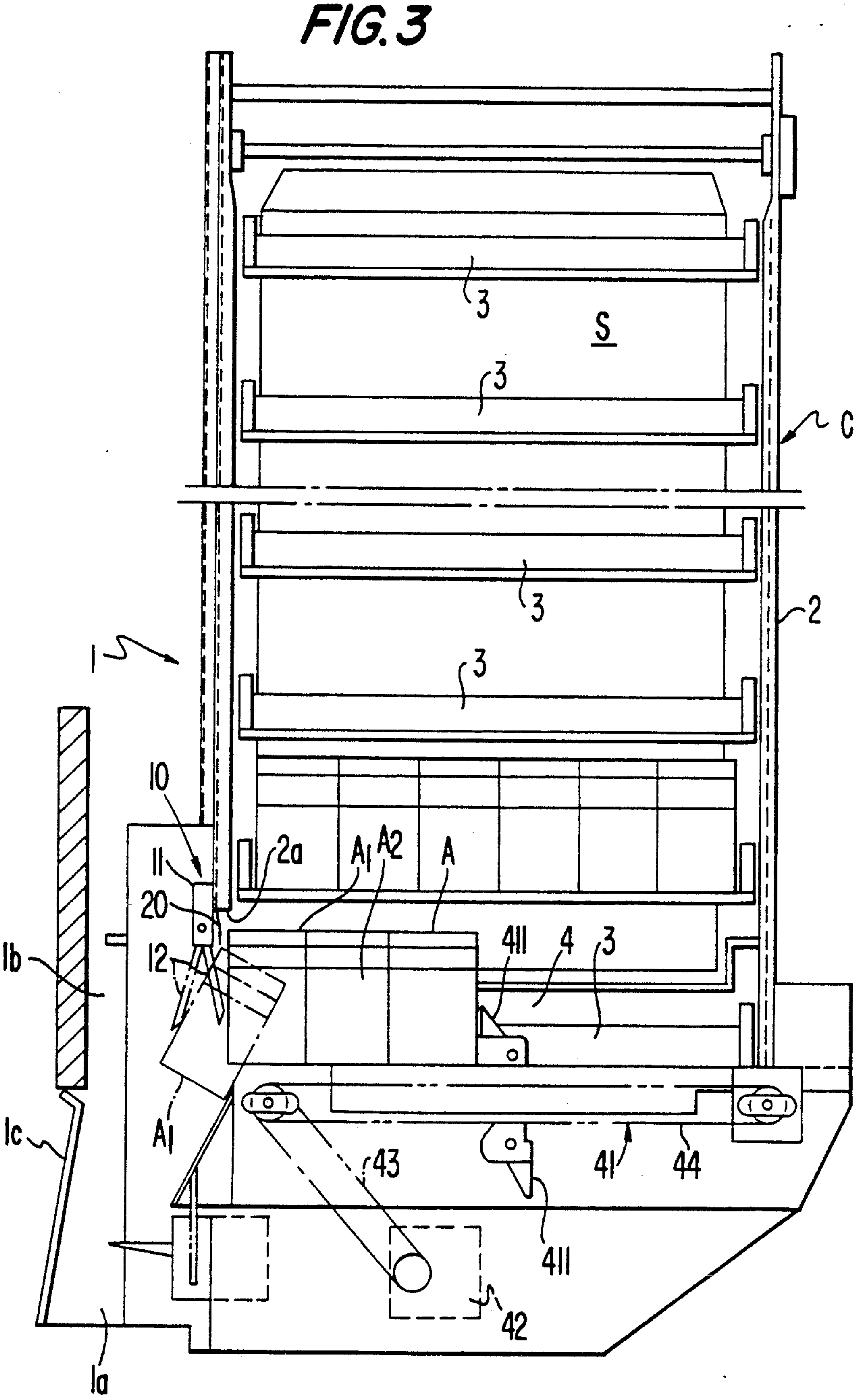
FIG. 3 is a partial sectional view of a vending machine illustrating the dispensing mechanism in accordance with one embodiment of the present invention.

Referring to FIG. 3, a vending machine with a dispensing mechanism in accordance with the present invention is shown. The general structure of the vending machine is similar to that of FIG. 1. Like numerals indicate like parts.

Automatic vending machine 1 has storage chamber S in which at least one column C is formed to store and dispense merchandise. Merchandise is delivered to discharge portion 1a of vending machine 1 from column C through discharge passage 1b. Dispensed merchandise can be removed from discharge portion 1*a* upon opening cover plate 1*c*. Column C includes outer frame 2 having merchandise discharge opening 2*a* at its lower front portion, a plurality of horizontal shelves 3 backwardly extending within frame 2, and dispensing mechanism 4 located on the lower portion of column C.

Each shelf 3 is vertically movably connected with each other, with the lowermost shelf 3 engaged with dispensing mechanism 4. Dispensing mechanism 4 includes conveying or pushing mechanism 41 having a pair of pushing elements 411 driven by motor 42 through endless chain elements 43, 44 and fall preventing device 10 which operates as a discharge control mechanism. Merchandise A stored on shelf 3 is dispensed individually by one pushing element 411. Pushing element 411 moves a horizontal distance sufficient to push one item of merchandise into discharge opening 2*a*.

As shown in FIG. 3, discharge control mechanism 10 is disposed on the upper portion of discharge opening 2*a* on outer frame 2. Discharge control mechanism 10 has box-like case element 11 in which control plate 12 and a control device for control plate 12 are disposed. Control plate 12 is rotatably or pivotally supported on case element 11 through support shaft 13 and extends into the upper portion of discharge opening 2*a* to contact merchandise A1.

Control plate 12 is normally biased toward discharge opening 2*a* by the recoil strength of double torsion type coil spring 14. Coil spring 14 is disposed around support shaft 13. One end portion of coil spring 14 contacts control plate 14 and the other end portion contacts support plate 15 fixed on case element 11. The movement of control plate 12 is restricted by locking element 16.

Locking element 16 is pivotally secured to case element 11 through shaft 17 disposed above an upper portion of control plate 12. Locking element 16 is biased downwardly by coil spring 18. Locking element 16 is connected to lever 191 of solenoid 19 which controls the movement of locking element 16. Locking portion 161 is formed on the lower portion of locking element 16. Locking portion 161 includes notch 162 which engages slant portion 121 formed on the upper portion of control plate 12. Thus, when solenoid 19 is off, lever 191 extends downwardly and locking portion 161 engages slant portion or projection 121 of control plate 12. Control plate 12 then is locked and can not pivot. When solenoid 19 is energized, lever 19 is moved upwardly and locking portion 161 disengages from slant portion 121 of control plate 12 so that control plate 12 can pivot away from the merchandise.

Posture control plate 20 is disposed on the upper opening of case element 11 facing outer frame 2. Posture control plate 20 controls the attitude of merchandise dispensed from discharge opening 2*a* causing merchandise A1 to fall bottom first, as shown by dotted and dashed line in FIG. 3.

As explained above, the movement and locking of control plate 12 is controlled by solenoid 19. When vending machine 1 is operated, solenoid 19 is energized and lever 191 pulls up locking element 16 to release locking portion 161 of locking element 16 from slant portion or projection 121 of control plate 12. Concurrently, pushing element 411, driven by motor 42, pushes merchandise A toward discharge passage 1*b*. When the force of pushing element 411 exceeds the recoil strength of coil spring 14, control plate 12 rotates to open discharge opening 2*a* to receive merchandise A.

Figure 4:
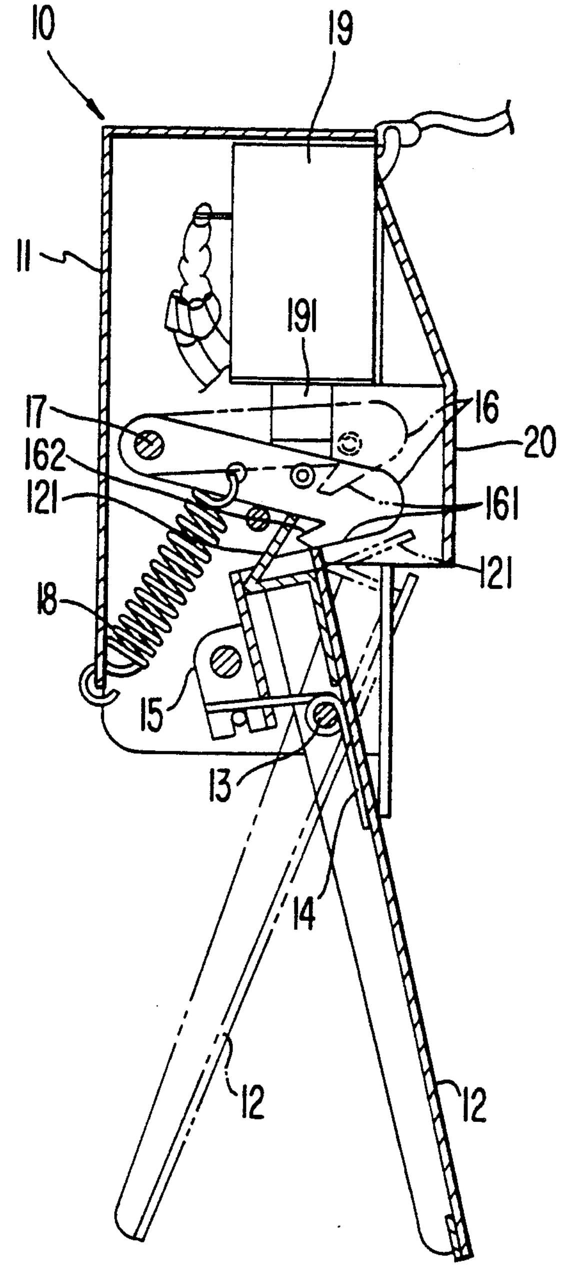
FIG. 4 is a sectional view of the merchandise fall preventing device used in the vending machine of FIG. 3.
Figure 5:
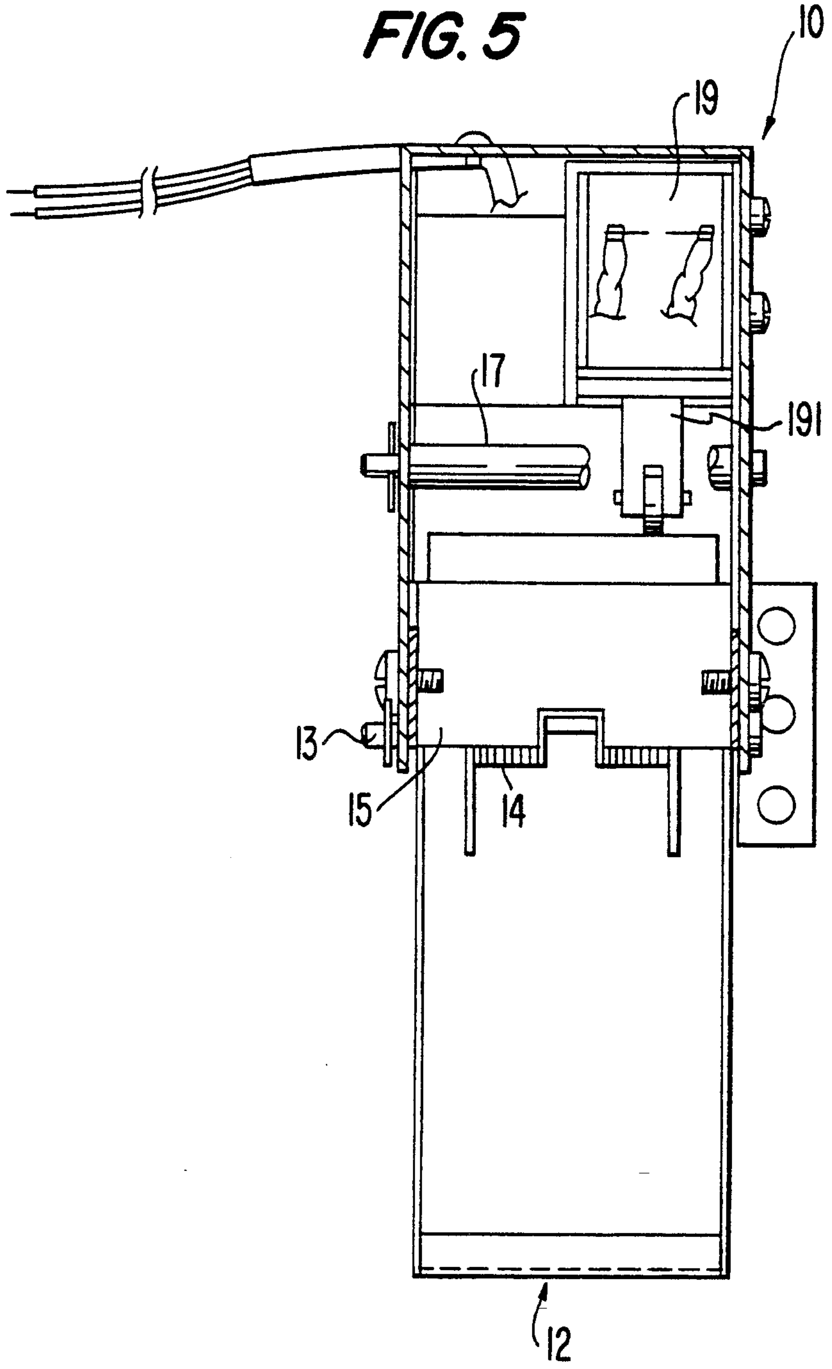
FIG. 5 is front view of the merchandise fall preventing device of FIG. 4.
Figure 6:
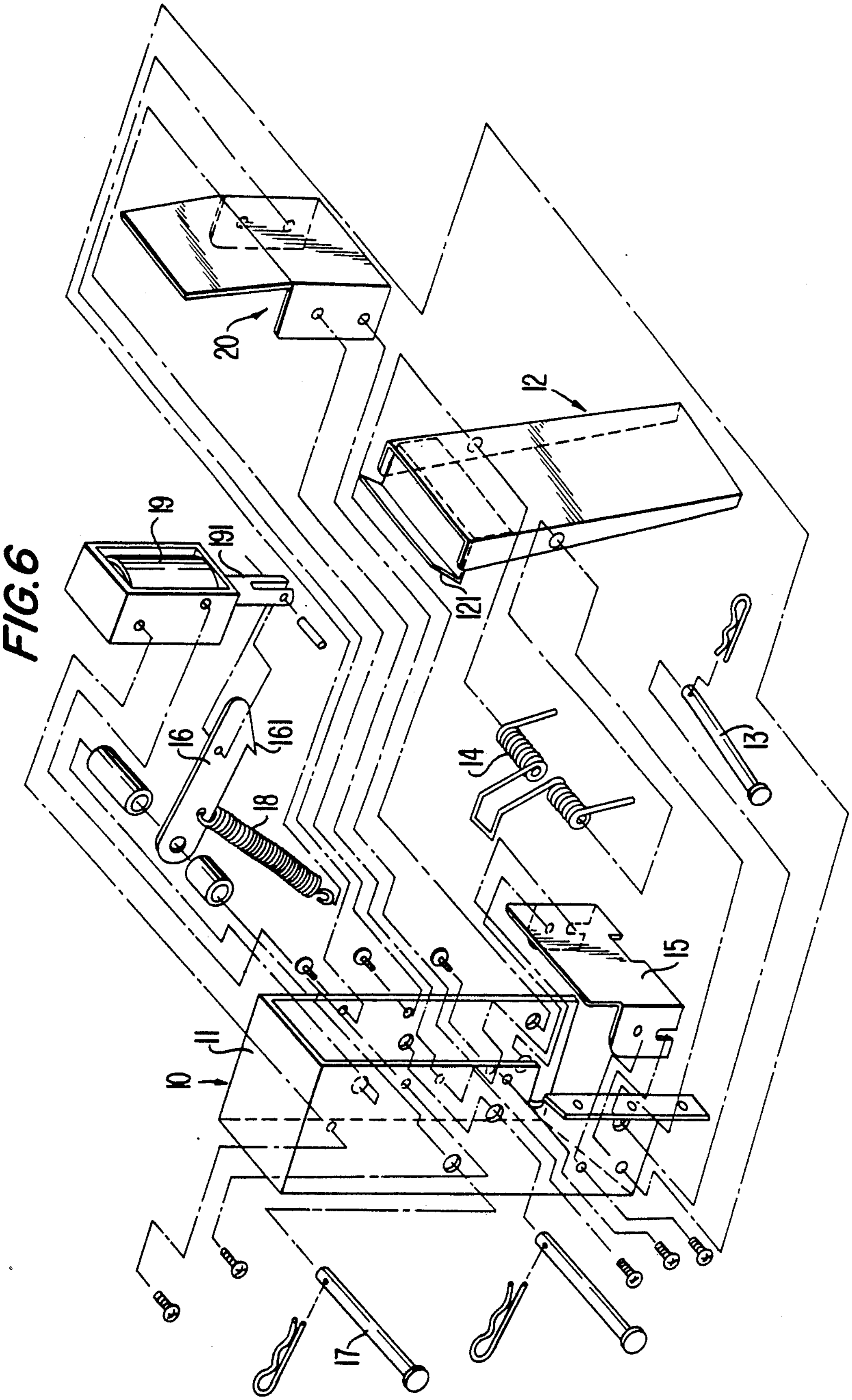
FIG. 6 is an exploded perspective view of the merchandise fall preventing device of FIG. 4.

During the dispensing operation, the upper portion of merchandise A1 is disposed against posture control plate 20 to prevent forward movement, and the lower portion of merchandise A1 is moved forwardly by pushing element 411. Thus, merchandise A1 falls bottom first through discharge opening 2*a*. After the dispensing operation is complete, the next piece of merchandise A2 is positioned adjacent discharge opening 2*a*. Coil spring 14 returns control plate 12 to its merchandise restricting position (shown in solid line in FIG. 4) and locking portion 161 of locking element 16 engages slant portion 121 of control plate 12 to lock control plate 12. Therefore, falling merchandise due to shaking, hitting, or tilting the vending machine is prevented, as is stealing merchandise by rotating the control plate from outside of the vending machine. Furthermore, the stored merchandise is less susceptible to damage, and is dispensed smoothly.

Numerous characteristics and advantages of the invention have been described in detail in the foregoing description with reference to the accompanying drawings. However, the disclosure is illustrative only and the invention is not limited to the precise illustrated embodiment. Various changes and modifications may be effected therein by one skilled in the art without departing from the scope or spirit of the invention.

We claim:

1. An automatic vending machine including at least one column for storing and dispensing merchandise, a discharge opening, and a dispensing mechanism, said column having at least one shelf for supporting merchandise, said dispensing mechanism comprising conveying means for conveying the merchandise through said discharge opening, and discharge control means for controlling the passage of said merchandise through said discharge opening, the improvement comprising:

said discharge control means comprising a control plate supported adjacent said discharge opening, biasing means for biasing said control plate toward said discharge opening and locking means for releasably locking said control plate, said locking means being movable from a first portion wherein said locking means locks said control plate and is in engagement therewith to a second position wherein said locking means releases said control plate and is out of engagement therewith, said discharge control means further comprising locking means control means for controlling position of said locking means, and wherein said discharge control means further comprises posture control means mounted adjacent said discharge opening for controlling the attitude of the merchandise while being dispensed so that the bottom of the merchandise is oriented downwardly.

2. An automatic vending machine, comprising:

a merchandise support shelf;

means for defining a merchandise discharge opening;

means for defining a merchandise discharge path between said shelf and said discharge opening;

discharge control means for controlling the passage of merchandise, from said discharge path, out through said discharge opening, said discharge control means including a control plate movable between a path position in the path of merchandise passing out said discharge opening and a discharge position permitting the passage of merchandise from said discharge path out said discharge opening and plate biasing means for biasing said control plate from the discharge position to the path position;

mechanical pushing means for pushing merchandise along at least a portion of said discharge path against said control plate, when in the path position, against the bias of said plate biasing means and to the discharge position;

solenoid means for locking said control plate in the path position and thereby blocking the passage of merchandise out said merchandise opening and unlocking said control plate, generally when said mechanical pushing means is pushing the merchandise, so that said mechanical pushing means pushes said control plate to the discharge position and merchandise out said discharge opening, wherein said solenoid means includes a locking member; and encasing means for encasing said locking member, said encasing means carrying a support shaft disposed therein;

wherein said control plate is pivotally supported on said support shaft.

3. The machine of claim 2 wherein said discharge control means includes a casing mounted adjacent said discharge opening and a support shaft mounted in said casing, and said control plate is pivotally mounted on said support shaft.

4. The machine of claim 2 further comprising at least one column for storing and dispensing the merchandise and said shelf being disposed in said column.

5. The machine of claim 2 wherein said control plate depends downwardly relative to said discharge path.

6. The machine of claim 2 wherein said discharge path has a discharge path tip, said means for defining said discharge opening includes said discharge path tip, and said plate biasing means biases said control plate towards said discharge opening.

7. The machine of claim 2 wherein said plate biasing means comprises spring biasing means.

8. The machine of claim 7 wherein said spring biasing means comprises a torsion bias spring mounted on a support shaft, said torsion bias spring is coupled to said control plate and to said casing.

9. The machine of claim 2 wherein said means for defining the discharge opening includes the discharge tip of said discharge path.

10. The machine of claim 9 wherein said discharge control means includes biasing means for biasing said control plate towards said discharge opening.

11. The machine of claim 2 wherein said solenoid means includes interengaging means for releasably interengaging said locking member and said control plate.

12. An automatic vending machine, comprising:

a merchandise support shelf;

means for defining a merchandise discharge opening;

means for defining a merchandise discharge path between said shelf and said discharge opening;

discharge control means for controlling the passage of merchandise, from siad discharge path, out through said discharge opening, said discharge control means including a control plate movable between a path position in the path of merchandise passing out said discharge opening and a discharge position permitting the passage of merchandise from said discharge path out said discharge opening and plate biasing means for biasing said control plate from the discharge position towards the path position;

solenoid means for controllably locking said control plate in the path position and thereby blocking the passage of merchandise out said merchandise opening and unlocking said control plate so that control plate can be moved to the discharge position and merchandise pass from said discharge path out said discharge opening;

wherein said solenoid means inlcudes a locking member having a notched portion locked position relative to said control plate when in the path position and a notched portion unlocked position, coil spring biasing means for biasing said locking member to the notched portion locked position, and a solenoid operatively connected to said locking member and controllably moving, against the bias of said coil spring biasing means, said locking member to the notched portion unlocked position; and encasing means for encasing said locking member, said encasing means carrying a support shaft disposed therein;

wherein said control plate is pivotally supported on said support shaft.

13. The machine of claim 12 wherein said solenoid means includes a link operatively connecting said solenoid with said locking member.

14. The machine of claim 13 wherein said link is connected to said locking member at a link location between the pivot axis and said notched portion.

15. The machine of claim 13 wherein said link is connected to said locking member by a pivotal pin connector.

16. The machine of claim 12 further comprising at least one column for storing and dispensing the merchandise and said shelf is disposed in said column.

17. The machine of claim 12 wherein said control plate depends downwardly relative to said discharge path.

18. The machine of claim 12 wherein said plate biasing means comprises a double torsion coil spring connected to said control plate.

19. The machine of claim 12 wherein said discharge control means includes a casing mounted adjacent said discharge opening and a support shaft mounted in said casing, and said control plate is pivotally mounted on said support shaft.

20. The machine of claim 19 wherein said plate biasing means comprises a torsion spring mounted on said support shaft and coupled to said control plate and to said casing.

21. The machine of claim 12 wherein said locking member operatively engages said control plate and said solenoid controllably moves said locking member relative to said control plate.

22. An automatic vending machine, comprising:

a merchandise support shelf;

means for defining a merchandise discharge opening;

means for defining a merchandise discharge path between said shelf and said discharge opening;

discharge control means for controlling the passage or merchandise, from said discharge path, out through said discharge opening, said discharge control means including a control plate movable between a path position in the path of merchandise passing out said discharge opening and a discharge position permitting the passage of merchandise from said discharge path out said discharge opening and plate biasing means for biasing said control plate from the discharge position to the path position;

mechanical pushing means for pushing merchandise along at least a portion of said discharge path against said control plate, when in the path position, against the bias of said path biasing means and to the discharge position;

solenoid means for locking said control plate in the path position and thereby blocking the passage of merchandise out said merchandise opening and unlocking said control plate, generally when said mechanical pushing means is pushing the merchandise, so that said mechanical pushing means pushes said control plate to the discharge position and merchandise out said discharge opening, said solenoid means including a locking member;

a casing mounted adjacent said discharge opening; and a support shaft mounted in said casing;

wherein said control plate is pivotally mounted on said support shaft, and said locking member is disposed above said support shaft.

23. An automatic vending machine, comprising:

a merchandise supporting shelf;

means for defining a merchandise discharge opening;

means for defining a merchandise discharge path between said shelf and said discharge opening;

discharge control means for controlling the passage of merchandise, from said discharge path, out through said discharge opening, said discharge control means including a control plate movable between a path position in the path of merchandise passing out said discharge opening and a discharge position permitting the passage of merchandise from said discharge path out said discharge opening and plate biasing means for biasing said control plate from the discharge position to the path position;

mechanical pushing means for pushing merchandise along at least a portion of said discharge path against said control plate, when in the path position, against the bias of said plate biasing means and to the discharge position; and solenoid means for locking said control plate in the path position and thereby blocking the passage of merchandise out said merchandise opening and unlocking said control plate, generally when said mechanical pushing means is pushing the merchandise, so that said mechanical pushing means pushes said control plate to the discharge position and merchandise out said discharge opening;

wherein said pushing means includes an endless chain, a pushing member attached to said endless chain for pushing the merchandise toward said discharge opening, and a motor driving said endless chain.

24. The machine of claim 23 wherein said motor is driven concurrently with the energization of said solenoid means.

25. An automatic vending machine, comprising:

a merchandise support shelf;

means for defining a merchandise discharge opening;

means for defining a merchandise discharge path between said shelf and said discharge opening;

discharge control means for controlling the passage of merchandise, from said discharge path, out through said discharge opening, said discharge means including a control plate movable between a path position in the path of merchandise passing out said discharge opening and a discharge position permitting the passage of merchandise from said discharge path out said discharge opening and plate biasing means for biasing said control plate from the discharge position to the path position;

mechanical pushing means for pushing merchandise along at least a portion of said discharge path against said control plate, when in the path position, against the bias of said plate biasing means and to the discharge position;

solenoid means for locking said control plate in the path position and thereby blocking the passage of merchandise out said merchandise opening and unlocking said control plate, generally when said mechanical pushing means is pushing the merchandise, so that said mechanical pushing means pushes said control plate to the discharge position and merchandise out said discharge opening; and attitude control means adjacent said discharge opening for controlling the attitude of merchandise which is being dispensed so that the bottom of the merchandise is oriented downwardly.

26. An automatic vending machine, comprising:

a merchandise support shelf;

means for defining a merchandise discharge opening;

means for defining a merchandise discharge path between said shelf and said discharge opening;

discharge control means for controlling the passage of merchandise, from said discharge path, out through said discharge opening, said discharge control means including a control plate movable between a path position in the path of merchandise passing out said discharge opening and a discharge position permitting the passage of merchandise from said discharge path out said discharge opening and plate biasing means for biasing said control plate from the discharge position towards the path position;

solenoid means for controllably locking said control plate in the path position and thereby blocking the passage of merchandise out said merchandise opening and unlocking said control plate so that said control plate can be moved to the discharge position and merchandise pass from said discharge path out said discharge opening;

wherein said solenoid means includes a locking member having a notched portion and pivotal about a pivot axis between a notched portion locked position relative to said control plate when in the path position and a notched portion unlocked position, coil spring biasing means for biasing said locking member to the notched portion locked position, and a solenoid operatively connected to said locking member and controllably moving, against the bias of said coil spring biasing means, said locking member to the notched portion unlocked position;

wherein said control plate includes a slant plate projection which said notched portion engages when said locking member is in the notched portion locked position.

27. An automatic vending machine, comprising:

a merchandise support shelf;

means for defining a merchandise discharge opening;

means for defining a merchandise discharge path between said shelf and said discharge opening;

discharge control means for controlling the passage of merchandise, from said discharhge path, out through said discharge opening, said discharge control means including a control plate movable between a path position in the path of merchandise passing out said discharge opening and a discharge position permitting the passage of merchandise from said discharge path out said discharge opening and plate biasing means for biasing said control plate from the discharge position towards the path position;

solenoid means for controllably locking said control plate in the path position and thereby blocking the passage of merchandise out said merchandise opening and unlocking said control plate so that said control plate can be moved to the discharge position and merchandise pass from said discharge path out said discharge opening;

wherein said solenoid means includes a locking member having a notched portion and pivotal about a pivot axis between a notched portion locked position relative to said control plate when in the path position and notched portion unlocked position, coil spring biasing means for biasing said locking member to the notched portion locked position, and a solenoid operatively connected to said locking member and controllably moving, against the bias of said coil spring biasing means, said locking member to he notched portion unlocked position; and attitude control means adjacent said discharge opening for controlling the attitude of merchandise which is being dispensed so that the bottom of the merchandise is oriented downwardly.

28. An automatic vending machine, comprising:

a merchandise support shelf;

means for defining a merchandise discharge opening;

means for defining a merchandise discharge path between said shelf and said discharge opening;

discharge control means for controlling the passage of merchandise, from said discharge path, out through said discharge opening, said discharge control means including a control plate movable between a path position in the path of merchandise passing out said discharge opening and a discharge position permitting the passage of merchandise from said discharge path out said discharge opening and plate biasing means for biasing said control plate from the discharge position towards the path position;

solenoid means for controllably locking said control plate in the path position and thereby blocking the passage of merchandise out said merchandise opening and unlocking said control plate so that control plate can be moved to the discharge position and merchandise pass from said discharge path out said discharge opening;

wherein said solenoid means includes a locking member having a notched portion locked position relative to said control plate when in the path position and a notched portion unlocked position, coil spring biasing means for biasing said locking member to the notched portion locked position, and a solenoid operatively connected to said locking member and controllably moving, against the bias of said coil spring biasing means, said locking member to the notched portion unlocked position; and encasing means for encasing said locking member;

wherein said coil spring biasing means is anchored to said encasing means while biasing said locking member to the notched portion locked position.

29. An autoamtic vending machine, comprising:

a merchandise support shelf;

means for defining a merchandise discharge opening;

means for defining a merchandise discharge path between said shelf and said discharge opening;

discharge control means for controlling the passage of merchandise, from said discharge path, out through said discharge opening, said discharge control means including a control plate movable betwen a path position in the path of merchandise passing out said discharge opening and a discharge position permitting the passage of merchandise from said discharge path out said discharge opening and plate biasing means for biasing said control plate from the discharge position to the path position;

mechanical pushing means for pushing merchandise along at least a portion of said discharge path aganist said control plate, when in the path position, against the bias of said plate biasing means and to the discharge position;

solenoid means for locking said control plate in the path position and thereby blocking the passage of merchandise out said merchandise opening and unlocking said control plate, generally when said mechanical pushing means is pushing the merchandise, so that said mechanical pushing means pushes said control plate to the discharge position and merchandise out said discharge opening, wherein said solenoid means includes a locking member; and encasing means for encasing said locking member, said encasing means carrying a support shaft disposed therein and said locking member being pivotally secured to said encasing means through said support shaft.

30. An automatic vending machine, comprising:

a merchandise support shelf;

means for defining a merchandise discharge opening;

means for defining a merchandise discharge path between said shelf and said discharge opening;

discharge control means for controlling the passage of merchandise, from said discharge path, out through said discharge opening, said discharge control means including a control plate movable between a path position in the path of merchandise passing out said discharge opening and a discharge position permitting the passage of merchandise from said discharge path out said discharge opening and plate biasing means for biasing said control plate from the discharge position towards the path position;

solenoid means for controllably locking said control plate in the path position and thereby blocking the passage of merchandise out said merchandise opening and unlocking said control plate so that said control plate can be moved to the discharge position and merchandise pass from said discharge path out said discharge opening;

wherein said solenoid means includes a locking member having a notched portion locked position relative to said control plate when in the path position and a notched portion unlocked position, coil spring biasing means for biasing said locking member to the notched portion locked position, and a solenoid operatively connected to said locking member and controllably moving, against the bias of said coil spring biasing means, said locking member to be notched portion unlocked position; and encasing means for encasing said locking member, said encasing means carrying a support shaft disposed therein, and said locking member being pivotally secured to said encasing means through said support shaft.

* * * * *